United States Patent
Nakibly et al.

(10) Patent No.: US 10,298,496 B1
(45) Date of Patent: May 21, 2019

(54) PACKET PROCESSING CACHE

(71) Applicant: Amazon Technologies, Inc., Seattle, WA (US)

(72) Inventors: Guy Nakibly, Kedumim (IL); Benzi Denkberg, Etz Efraim (IL); Erez Izenberg, Tel Aviv (IL); Nafea Bshara, San Jose, CA (US); Uri Leder, Lotem (IL); Ofer Frishman, Hod-Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 15/716,036

(22) Filed: Sep. 26, 2017

(51) Int. Cl.
*H04L 12/747* (2013.01)
*H04L 12/861* (2013.01)
*G06F 12/0802* (2016.01)
*H04L 29/06* (2006.01)
*H04L 12/931* (2013.01)

(52) U.S. Cl.
CPC ........ *H04L 45/742* (2013.01); *G06F 12/0802* (2013.01); *H04L 49/90* (2013.01); *H04L 49/35* (2013.01); *H04L 69/22* (2013.01)

(58) Field of Classification Search
CPC ....... H04L 45/742; H04L 49/90; H04L 49/35; H04L 69/22; G06F 12/0802
See application file for complete search history.

(56) References Cited

U.S. PATENT DOCUMENTS

| | | | |
|---|---|---|---|
| 7,222,222 B1 | 5/2007 | Vartti et al. | |
| 7,337,275 B2 * | 2/2008 | Wolrich | H04L 49/90 710/52 |
| 2002/0152328 A1 | 10/2002 | Kagan et al. | |
| 2004/0034743 A1 * | 2/2004 | Wolrich | H04L 49/90 711/132 |
| 2006/0143415 A1 | 6/2006 | Naik | |
| 2006/0161741 A1 | 7/2006 | Yasue et al. | |
| 2007/0266196 A1 | 11/2007 | Torii | |
| 2008/0270744 A1 | 10/2008 | Hashimoto | |
| 2013/0042077 A1 | 2/2013 | Mannava et al. | |
| 2013/0266021 A1 * | 10/2013 | Basso | G06F 5/10 370/413 |
| 2014/0181409 A1 * | 6/2014 | Manula | G06F 12/123 711/133 |
| 2015/0347185 A1 | 12/2015 | Holt et al. | |

(Continued)

OTHER PUBLICATIONS

U.S. Appl. No. 15/716,010, filed Sep. 26, 2017, Titled: Controlling Shared Resources and Context Data.

*Primary Examiner* — Min Jung
(74) *Attorney, Agent, or Firm* — Kilpatrick Townsend & Stockton LLP

(57) ABSTRACT

A data or packet processing device such as a network interface controller may include cache control logic that is configured to receive a first request for processing a first data packet associated with the queue identifier, and obtain a set of memory descriptors associated with the queue identifier from the memory. The set of descriptors can be stored in the cache. When a second request for processing a second data packet associated with the queue identifier is received, the cache control logic can determine that the cache is storing memory descriptors for processing the second data packet, and provide the memory descriptors used for processing the second packet.

20 Claims, 10 Drawing Sheets

(56) References Cited

U.S. PATENT DOCUMENTS

2018/0019871 A1    1/2018   Gage
2018/0246828 A1    8/2018   Choi et al.
2018/0248813 A1*   8/2018   Zheng ................ G06F 12/0875

* cited by examiner

Figure 2C:
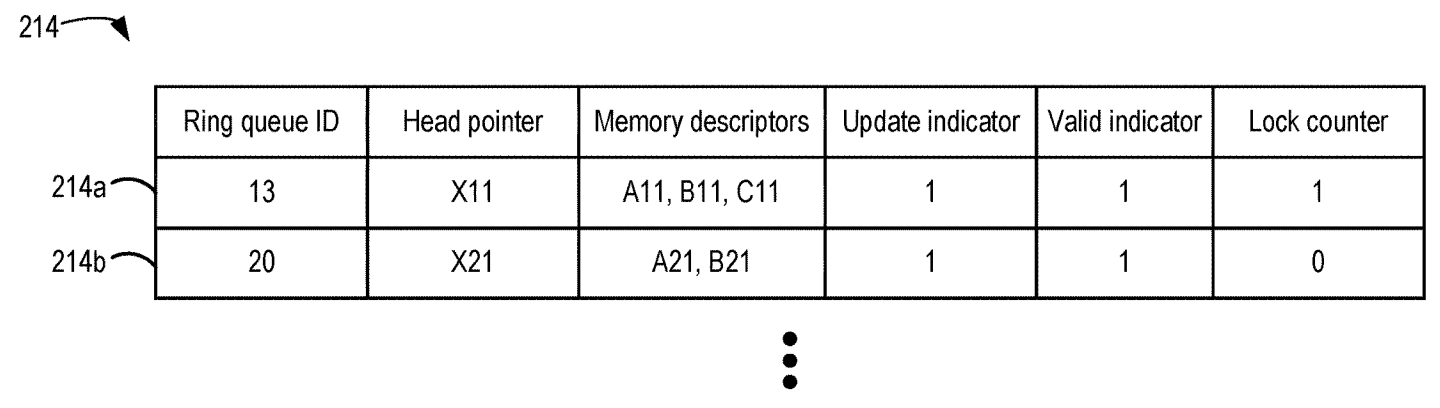

| Ring queue ID | Head pointer | Memory descriptors | Update indicator | Valid indicator | Lock counter |
|---|---|---|---|---|---|
| 13 | X11 | A11, B11, C11 | 1 | 1 | 1 |
| 20 | X21 | A21, B21 | 1 | 1 | 0 |

214a → row 1; 214b → row 2; 214 = table

| Ring queue ID | Head pointer | Memory descriptors | Updated indicator | Valid indicator | Lock counter |
|---|---|---|---|---|---|
| 13 | ✕ | ✕ | 0 | 1 | 0 |

214a

304

| Ring queue ID | Head pointer | Memory descriptors | Update indicator | Valid indicator | Lock counter |
|---|---|---|---|---|---|
| 13 | ✕ | ✕ | 0 | 1 | 1 |

214a

306

| Ring queue ID | Head pointer | Memory descriptors | Update indicator | Valid indicator | Lock counter |
|---|---|---|---|---|---|
| 13 | X11 | A11, B11, C11 | 1 | 1 | 1 |

214a

308

| Ring queue ID | Head pointer | Memory descriptors | Update indicator | Valid indicator | Lock counter |
|---|---|---|---|---|---|
| 13 | X11 | A11, B11, C11 | 0 | 1 | 0 |

PACKET PROCESSING CACHE

BACKGROUND

A network interface controller can provide a host device with connectivity to a network, and allows the host device to engage in packetized communication over the network. The network interface controller can have multiple ports for transmitting and receiving data packets, and a processor to execute various processing tasks to provide the packetized communication via the network ports. These tasks may include, for example, receiving data from the computing device, generating packet payload, assembling packets to include header information, and transmitting the assembled packets into the network towards target destinations. These tasks may also include receiving packets from the network, extracting data from the received packets, and providing the data to the host device.

A network interface controller may implement queues to buffer pending packet processing tasks before their execution. The queues can store information or configuration data used for execution of these pending packet processing tasks. As network speed and bandwidth increases, the number of packets concurrently being processed by a network interface controller has also dramatically increased. To keep up with the network speed and bandwidth, network interface controllers have to increase their queue capacity to accommodate the increase in packet processing load. Bigger queue capacity also means that the queues are often implemented in high capacity memory devices. However, accessing the information or configuration data stored in these queues implemented in high capacity memory devices can add to the processing latency.

BRIEF DESCRIPTION OF THE DRAWINGS

Various embodiments in accordance with the present disclosure will be described with reference to the drawings, in which:

FIGS. 2B and 2C show examples of some of the components of the system of FIG. 2A, according to certain aspects of the disclosure;

FIG. 3 shows examples of operations of the system of FIG. 2A, according to certain aspects of the disclosure;

DETAILED DESCRIPTION

Figure 1:
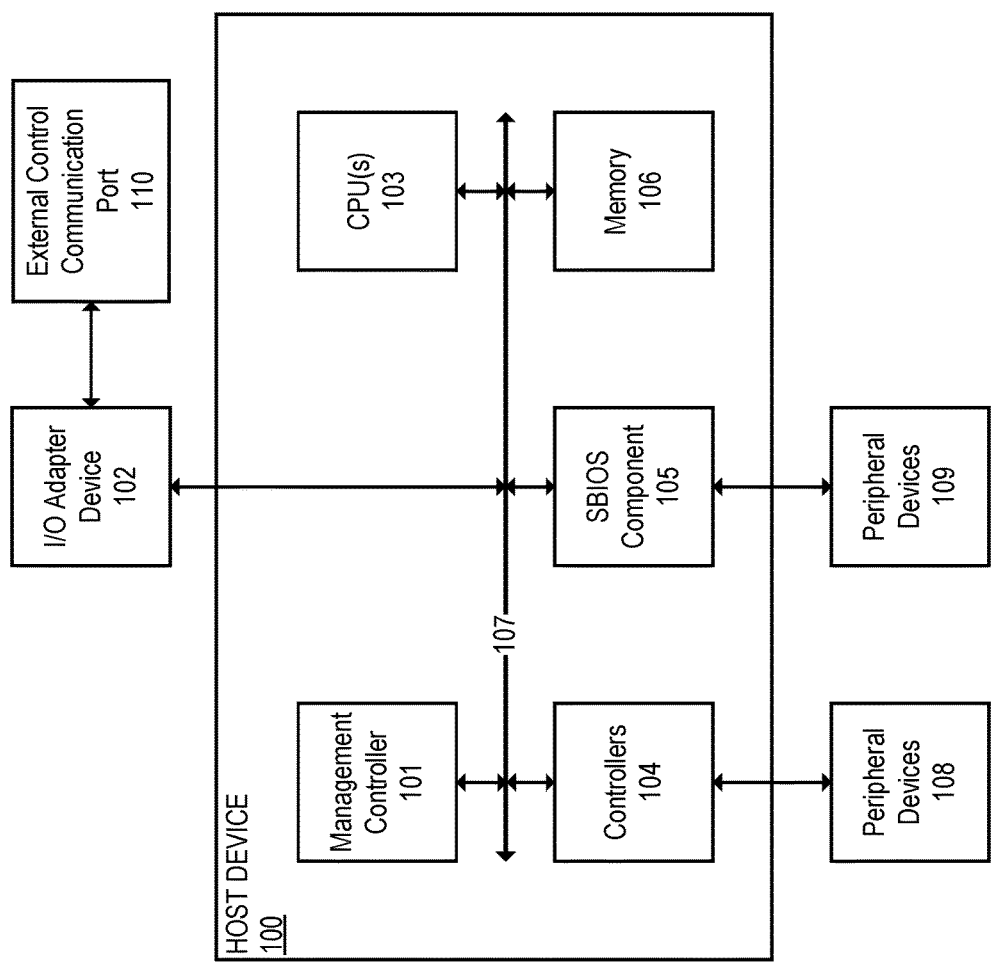
FIG. 1 shows a host computing device, according to certain aspects of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network interface controller can implement high-capacity queues (e.g., ring queues, FIFOs, etc.) to buffer a large volume of pending packet processing tasks. These high capacity queues are provided to reduce the likelihood of dropping incoming packet processing tasks due to execution latency at the controller. The high capacity queues of the network interface controller can buffer, for example, up to a million or more pending packet processing tasks for processing any number of packets, and have the capacity to store information or configuration data for each of these tasks. Such information may include descriptors (e.g., memory descriptors or pointers to location in memory) that enable the controller and/or the host device to store and access data of a received packet, or data to be included in a packet for transmission.

Each queue can be associated with a set of pointers including a base pointer, a head pointer, and a tail pointer. The base pointer can be a base address associated with a memory space allocated for the queue. The head pointer can be an address associated with a memory location that corresponds to the head of the queue and is associated with the first task to be executed. The tail pointer can be an address associated with a memory location that corresponds to the tail of the queue and is associated with the last task to be executed. The controller or host software can insert a new task (e.g., by storing the associated configuration data) at the queue entry referenced by the tail pointer. The controller can retrieve a task (e.g., by retrieving the configuration data associated with the task) at the queue entry referenced by the head pointer. After a task has been retrieved and processed, the head pointer can be updated to point to the next entry in the queue. In some implementations, the queues can be managed as first-in-first-out (FIFO) buffers, in which the tasks being retrieved follow the order by which the tasks are inserted in the queue.

Because of the capacity requirement, these queues are typically implemented in high capacity memory components, such as dynamic random memory (DRAM) devices. In some embodiments, the high capacity memory components can be implemented as off-chip memory components. The latency incurred in accessing the configuration data from the high capacity queues can add to the execution latency at the controller, and the performance of the network interface can be degraded as a result.

Techniques for facilitating access to the configuration data stored in queues utilized by a network interface controller are described. The configuration data may include, for example, memory descriptors for accessing packet information stored in the queues utilized by a network interface controller. A cache memory is provided to cache a subset of configuration data (e.g., memory descriptors) from the queues for upcoming packet processing tasks. The set of configuration data can be prefetched from the queues before the execution of the packet processing tasks. In some embodiments, the cache memory can also store an update status of the configuration data stored in the cache memory. The cache memory can receive a request for configuration data associated with a packet processing task from a processor of the network interface controller, and transmit the requested configuration data to the processor, for example, if the update status indicates that the configuration data is the most up-to-date.

In some embodiments, the cache memory can be implemented as embedded memory devices (e.g., static random access memory (SRAM)), and can provide faster access latency than the memory components used for implementing the queues. As such, the processor can access the configuration data and execute the associated packet processing tasks at a higher speed. Moreover, by keeping track of the update status of the stored configuration data, the cache memory can also provide the most up-to-date configuration data for a particular request, and facilitate proper execution of the associated packet processing task. For example, each entry in the cache memory can be allocated for a particular queue. By keeping track of the update status of the configuration stored in the cache entry, the same cache entry can be used and shared by any number of packets being processed by the network interface controller that are associated with the same queue. The size of the cache entry corresponding to a high capacity queue can be kept relatively small depending on the maximum number of memory descriptors that may be needed to process a particular packet in the queue. These techniques can improve the performance of the network adapter, and lead to more efficient usage of the networking resources provided by the network interface controller.

FIG. 1 illustrates a host computing device 100 including an I/O adapter device 102, according to some embodiments. Host computing device 100 can be associated with various hardware components, software components and respective configurations that facilitate the implementation of packetized communications. Specifically, in some embodiments, host computing device 100 can include a management controller 101 for managing the operation of host computing device 100 in accordance with the Intelligent Platform Management Interface ("IPMI"). The management controller 101 can include an embedded microcontroller that manages the interface between system management software and host computing device 100 components.

I/O adapter device 102 is coupled to management controller 101, and can act as a bridge for facilitating access between various physical and emulated components and a communication channel 107. In some embodiments, I/O adapter device 102 can include an embedded processor to execute computer executable instructions related to accessing the various physical and emulated components. In some embodiments, I/O adapter device 102 can be implemented using multiple discrete hardware elements, such as multiple cards or other devices. Management controller 101 can be configured in such a way to be electrically isolated from other components in host computing device 100 except for I/O adapter device 102.

Also in communication with I/O adapter device 102 may be an external communication port component 110 for establishing communication channels between the host computing device 100 and one or more network based services or other computing devices. In some embodiments, I/O adapter device 102 and/or external communication port component 110 can be part of a network adapter such as a network interface controller. External communication port component 110 may correspond to a network interface port (e.g., an Ethernet port), or a network switch, sometimes known as a Top of Rack ("TOR") switch. I/O adapter device 102 can utilize the external communication port component 110 to perform packetized communications between one or more services and host computing device 100.

I/O adapter device 102 can also be in communication with a System Basic Input/Output System (SBIOS) component 105. SBIOS component 105 can include non-transitory executable code, often referred to as firmware, that can be executed by one or more processors and used to cause components of the host computing device 100 to initialize and identify system devices such as the video display card, keyboard and mouse, hard disk drive, optical disc drive and other hardware. SBIOS component 105 can also include or locate boot loader software that will be utilized to boot the host computing device 100. For example, in one embodiment, the SBIOS component 105 can include executable code that, when executed by a processor, causes the host computing device 100 to attempt to locate Preboot Execution Environment (PXE) boot software. Additionally, SBIOS component 105 can include or takes the benefit of a hardware latch that is electrically controlled by I/O adapter 102. The hardware latch can restrict access to one or more aspects of SBIOS component 105, such controlling modifications or configurations of the executable code maintained in SBIOS component 105.

SBIOS component 105 can be connected to (or in communication with) a number of additional computing device resources components, such as central processing units ("CPUs") 103, memory 106 (e.g., RAM), and the like. In one embodiment, such computing device resource components may include physical computing device resources in communication with other components via communication channel 107. Communication channel 107 can correspond to one or more communication buses, such as a shared bus (e.g., a front side bus, a memory bus), a point-to-point bus such as a PCI or PCI Express bus, etc., in which the components of host computing device 100 communicate. In addition, although communication channel 107 in FIG. 1 is shown as connecting all of components 101-106, it should be appreciated that a communication channel in accordance with some embodiments may connect any subset of the components 101-106 and/or other components. For example, a communication channel may connect a PCI Express device to a CPU via a northbridge or host bridge.

Also in communication with I/O adapter device 102 via communication channel 107 may be one or more controller components 104 for managing hard drives or other forms of memory. An example of a controller component 104 can be a SATA hard drive controller. Host computing device 100 can also include additional components that are in communication with one or more of the illustrative components associated with the device 100. Such components can include devices, such as one or more controllers 104 in combination with one or more peripheral devices 108, such as hard disks or other storage devices. Additionally, the additional components of the host computing device 100 can include another set of peripheral devices 109, such as Graphics Processing Units ("GPUs").

Figure 2A:
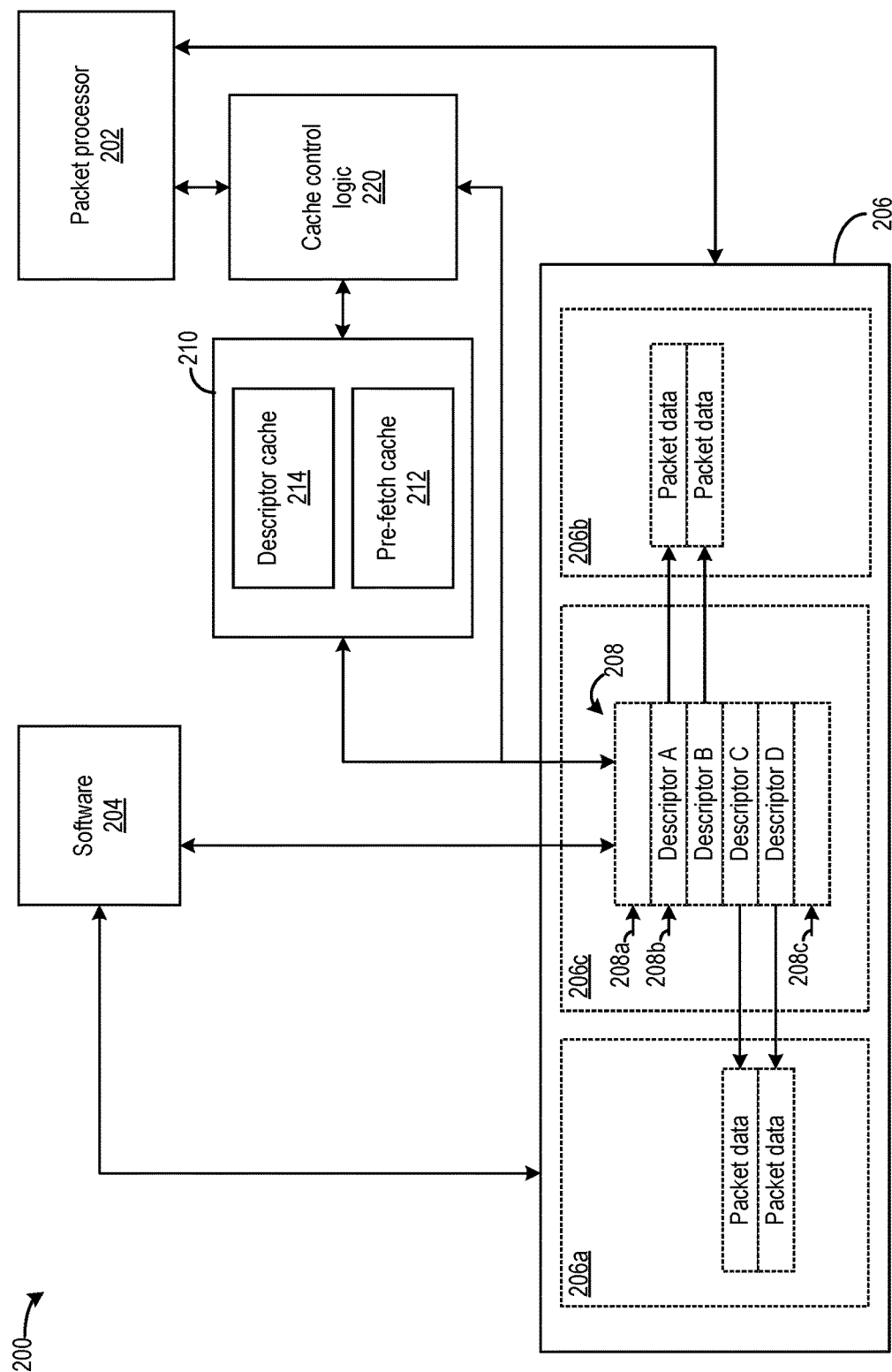
FIG. 2A shows an example of a packet processing system, according to certain aspects of the disclosure.

FIG. 2A illustrates a system 200 for performing packetized communications, according to certain aspects of the disclosure. System 200 includes a packet processor 202, software 204, and a storage memory 206. At least part of system 200 can be implemented on host computing system 100 of FIG. 1. For example, packet processor 202 can be part of I/O adapter device 102 or external control communication port 110 of FIG. 1. In some embodiments, one or more components of system 200 can be implemented as a network interface controller that can execute packet processing tasks. The packet processing tasks may include, for example, assembling packets for transmission at the network interface, extracting payload data from packets received at the network interface, etc. Packet processor 202 can be a data processor implemented using one or more microprocessor cores, an FPGA, an SoC, an ASIC, a programmable array logic (PAL), a complex programmable logic device (CPLD), or any combination thereof. In some embodiments, software 204 can be host software executed by CPU 103 of host computing system 100 of FIG. 1. Software 204 can be, for example, a driver operating in a virtual machine hosted by host computing system 100. The driver may operate with packet processor 202 to transmit packets over a network interface port of external control communication port 110, process packets received at the network interface port, and perform packetized communication with another computing device over a network.

In some embodiments, software 204 and packet processor 202 can communicate with each other using communication channel 107 (e.g., a PCI Express bus) of FIG. 1, and via storage memory 206. Storage memory 206 can be implemented using DRAM and can be part of memory device 106 of FIG. 1. In some embodiments, storage memory 206 can also be implemented using other suitable memory technologies such as flash memory, SRAM, etc. Storage memory 206 can be accessible by both packet processor 202 and software 204. For example, to transmit a packet, software 204 can store the data to be included in the packet payload in memory region 206a of storage memory 206. Software 204 can provide a memory descriptor that points to the data in memory region 206a to packet processor 202. Packet processor 202 can perform direct memory access (DMA) using the memory descriptor to obtain the data from memory region 206a, and receive the data via communication channel 107 (e.g., a PCI Express bus). Packet processor 202 can assemble the packet using the retrieved data, and then transmit the packet to a network via a network interface port. As another example, software 204 may expect to receive a packet, and can provide a memory descriptor that points to a designated location in memory region 206b of memory device 206 for storing the payload data of the received packet. After a packet is received at the network interface port, packet processor 202 can extract payload data from the received packet, transmit the data to host computing device 100 via communication channel 107 (e.g., a PCI Express bus), and perform DMA to store the payload data in the location of memory region 206b designated by software 204. Packet processor 202 can then notify software 204 that the payload data has been stored (e.g., by raising an interrupt). Software 204, after receiving the notification, can retrieve the data from the designated location of memory region 206b using the memory descriptor.

Packet processor 202 and software 204 can communicate with each other by accessing storage memory 206 using the memory descriptors stored in queue 208 (e.g., a ring queue). In the example shown in FIG. 2A, queue 208 can include multiple entries and can be stored in memory region 206c of storage memory 206. The memory descriptors (or other configuration data) stored in queue 208 can be associated with one or more packet processing tasks (e.g., to assemble a packet for transmission, to extract payload data from a received packet, etc.) to be executed by packet processor 202, and can point to locations within memory regions 206a and 206b where software 204 and packet processor 202 access packet data. Queue 208 (e.g., a ring queue) can be associated with a base pointer 208a, a head pointer 208b, a tail pointer 208c, and optionally, a queue identifier (ID) (e.g., a ring queue ID). Base pointer 208a can point to a memory block where queue 208 is being stored. In a case where system 200 includes multiple queues, each of the queues can be associated with different base pointers 208a. The queue ID can be an identifier for identifying a particular queue 208. In some embodiments, the queue ID can be associated with a particular physical or logical port of the network interface controller. In some embodiments, the queue ID can also be associated with certain classification of the packets being processes by the queue (e.g., packets from/to a particular source/destination, packets associated with a particular processing thread, packets correspond to a certain protocol, etc.). In some embodiments, the queue ID can be derived, for example, from the base pointer associated with the queue.

Head pointer 208b and tail pointer 208c can be used by software 204 and packet processor 202 to manage the memory descriptors stored in queue 208. For example, software 204 can insert the memory descriptors for a new packet processing task (e.g., to process a received packet, to generate a packet for transmission, etc.) into queue 208 starting from the entry associated with tail pointer 208c. After the insertion, tail pointer 208c can be advanced to point to the next available entry in queue 208. To execute a packet processing task inserted by software 204, packet processor 202 may obtain a memory descriptor stored in the entry associated with head pointer 208b (e.g., descriptor "A"), or a set of memory descriptors in a set of entries starting with the entry associated with head pointer 208b (e.g., descriptors "A" and "B"). Once packet processor 202 has obtained the necessary memory descriptors for a particular packet processing task, the packet processing task can proceed to the execution stage to process a received packet or to process a packet for transmission. Packet processor 202 can then access the packet data stored in memory regions 206a and 206b using the memory descriptors. After consuming the memory descriptors, head pointer 208b will be updated to point to the next entry in queue 208. Packet processor 202 can obtain a new set of memory descriptors based on updated head pointer 208b, and access the packet data in storage memory 206 using the new set of memory descriptors for another packet process task.

System 200 may further include a cache memory 210, which may include a prefetch cache 112 and a descriptor cache 214, to facilitate the accessing of the memory descriptors in queue 208 by processor 202. Both prefetch cache 112 and descriptor cache 214 can be implemented using SRAM or other suitable memory technologies, and can be part of processor 202 or an SOC that includes packet processor 202. Cache memory 210 can be managed by a cache control logic 220, which also interfaces with packet processor 202. Cache control logic 220 can be implemented as a cache controller. In some embodiments, cache control logic 220 may be implemented using one of an FPGA, an SoC, an ASIC, a programmable array logic (PAL), a complex programmable logic device (CPLD), or dedicated circuitry, etc. Under the control of packet processor 202, cache control logic 220 and prefetch cache 212 can obtain and store a set of memory descriptors from queue 208 before packet processor 202 uses these memory descriptors. For example, as one packet processing task enters the execution stage, packet processor 202 can determine the new head pointer pointing to the next set of memory descriptors for the next packet processing task, and instruct cache control logic 220 and/or prefetch cache 212 to prefetch the next set of memory descriptors. Prefetch cache 212 can store the memory addresses associated with the memory descriptors in queue 208, as well as the queue ID of queue 208. Descriptor cache 214 can store multiple entries that are each associated with a particular queue. For example, each entry in descriptor cache 214 may store a set of memory descriptors obtained from prefetch cache 212 for a particular packet processing task associated with a queue, a head pointer 208b associated with the set of memory descriptors, as well as the queue ID of the queue from which the set of memory descriptors are fetched. By way of example, the memory descriptors stored in prefetch cache 212 and packet descriptor cache 214 as discussed below can be obtained from queue 208 of FIG. 2A.

Cache control logic 220 can manage the caching of the memory descriptors in prefetch cache 212 and descriptor cache 214. For example, cache control logic 220 may receive, from packet processor 202, a request for memory descriptors associated with a packet processing task (e.g., a request to process a packet associated with a queue ID). Cache control logic 220 may determine whether the requested memory descriptors are cached in descriptor cache 214 and/or prefetch cache 212. Cache control logic 220 can first determine whether the requested memory descriptors are stored in descriptor cache 214. The determination can be made based on whether a matching queue ID (with the queue ID included in the request) is found in descriptor cache 214 (e.g., a cache-hit). If a matching queue ID is not found (e.g., a cache-miss), cache control logic 220 can then determine whether the queue ID and the memory addresses of the requested memory descriptors (e.g., based on the current value of head pointer 208b and the number of requested memory descriptors) can be found in prefetch cache 212. If they are found, cache control logic 220 can control descriptor cache 214 to obtain the requested memory descriptors from prefetch cache 112, and provide the memory descriptors to packet processor 202 in response to the request. If the matching queue ID and the memory addresses of the requested memory descriptors are not found in prefetch cache 212, cache control logic 220 can control prefetch cache 112 to prefetch a set of memory descriptors, including the requested memory descriptors from queue 208.

To process the next request, cache control logic 220 can also update the value of current head pointer 208b stored in descriptor cache 214, and obtain a new set of memory descriptors from prefetch cache 212 based on the updated value of head pointer 208b. Descriptor cache 214 can also store an update indicator to track whether the head pointer for the next request is available so that the memory descriptors for the next request can be obtained. Cache control logic 220 can then provide the memory descriptors stored in packet descriptor cache 214 to packet processor 202 when the update indicator is asserted, which may indicate that the memory descriptors stored in the cache are the most up-to-date and are available for accessing by packet processor 202.

Figure 2B:
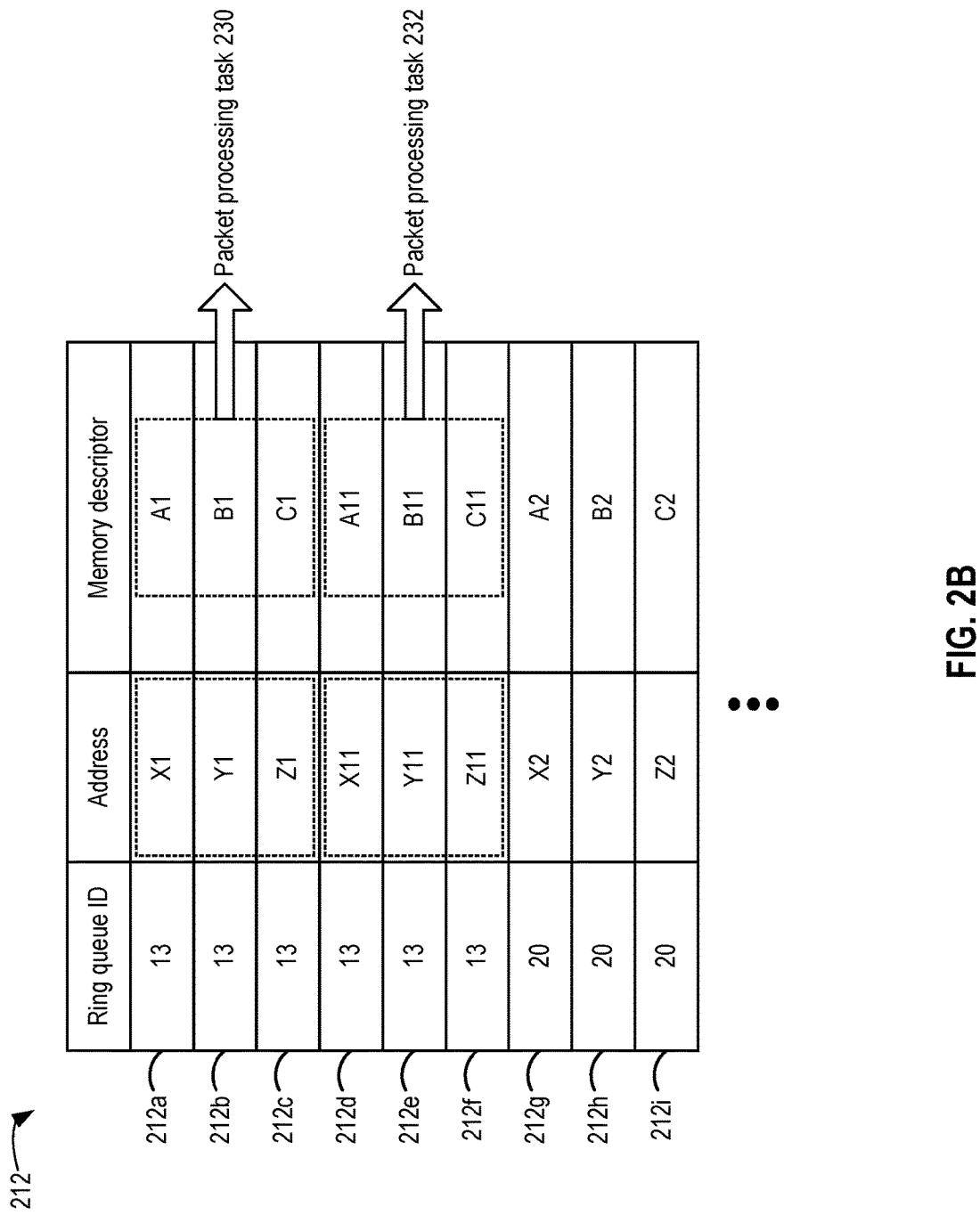

FIG. 2B shows an example structure of prefetch cache 212, according to certain aspects of the disclosure. In the example shown in FIG. 2B, prefetch cache 212 includes a set of entries 212a-212i. Each entry stores a queue ID, a memory descriptor (or other configuration data), and an address associated with the memory descriptor in a queue (e.g., queue 208). In scenarios where system 200 includes multiple queues, prefetch cache 212 can store memory descriptors prefetched from different queues, and associate the memory descriptors with the queue IDs of these queues. As discussed above, the queue ID can be used to determine whether prefetch cache 212 stores the memory descriptors requested by packet processor 202. The memory descriptors stored in prefetch cache 212 can be a series of memory descriptors to be requested by processor 202 for performing one or more packet processing tasks. For example, the memory descriptors stored in entries 212a-212c can be a set of descriptors for packet processing task 230, whereas the memory descriptors stored in entries 212d-212f can be another set of memory descriptors for packet processing task 232. As each packet processing task is performed, head pointer 208b can be updated to point to the start of the memory descriptors for the next packet processing task. For example, when packet processing task 230 is the next task to be executed, address "X1" (of entry 212a) can be the value of head pointer 208b, whereas when packet processing task 232 is the next task to be executed, address "X11" (of entry 212d) can be the value of head pointer 208b. It should be noted that although the example shown in FIG. 2B utilizes the same number of memory descriptors for both packet processing tasks 230 and 232, in some embodiments, different packet process tasks may use and request different number of memory descriptors.

Cache control logic 220 can control prefetch cache 212 to prefetch and store a set of memory descriptors based on a determination that at least some of the memory descriptors are going to be consumed by packet processor 202 in the near future. For example, at a certain point in time, control logic 220 may receive a request for memory descriptors for packet processing task 230 (associated with head pointer "X1"). Control logic 220 may determine at that time that descriptor cache 214 does not have the requested memory descriptors stored therein, and a cache-miss is detected. The detection of the cache-miss can be based on, for example, that descriptor cache 214 does not contain the queue ID (which was included as part of the request) to indicate that descriptor cache 214 has not yet allocated any entry to this queue ID. Based on the detection of the cache-miss, cache control logic 220 may then determine whether some or all of the requested memory descriptors are being processed and stored in prefetch cache 212. The determination can be based on whether prefetch cache 212 contains the queue ID and an address that corresponds to head pointer "X1." If the requested memory descriptors and/or the queue ID are not stored in prefetch cache 212, control logic 220 can control prefetch cache 212 to prefetch the set of memory descriptors for packet processing task 230.

Control logic 220 under instruction from packet processor 202 can also control prefetch cache 212 to prefetch additional memory descriptors for additional packet processing tasks to be executed after packet processing task 230. For example, based on the head pointer value "X1" and the number of memory descriptors to be fetched for that head pointer, packet processor 202 can determine that the next set of memory descriptors will be associated with the head pointer value "X11" (for packet processing task 232) as the packet processing tasks associated with head pointer value "X1" progresses to the execution stage. Based on this determination, cache control logic 220 can control prefetch cache 212 to prefetch, from queue 208, a number of additional memory descriptors starting from the entry with address "X11." In some embodiments, the number of memory descriptors retrieved for each packet processing task can be a predetermined number depending on the particular application, and can be a configurable or fixed value. In some embodiments, different packets may use different number of memory descriptors, and the number of memory descriptors retrieved for each packet processing task can be variable. For example, the number of memory descriptors retrieved for each packet processing task can be determined by the type of packet being processed, the length of the packet, and/or information contained in the header of the packet, etc.

In addition, cache control logic 220 can also perform other prefetch management operations. For example, cache control logic 220 can determine the current value of tail pointer 208c of queue 208, and prefetch the number of memory descriptors available in queue 208. Moreover, cache control logic 220 can also remove, from prefetch cache 212, the prefetched memory descriptors that have been sent to descriptor cache 214. Cache control logic 220 can also control prefetch cache 212 to prefetch a new set of memory descriptors from queue 208 to replace the removed memory descriptors so that a minimum number of prefetched memory descriptors can be maintained in prefetch cache 212).

Prefetch cache 212 can also store other management information not shown in FIG. 2B. For example, prefetch cache 212 can also store a least-recently-used (LRU) indicator (e.g., a timestamp) for each of entries 212a-212i. If prefetch cache 112 is full, cache control logic 220 can determine which entry to deallocate or evict based on a LRU eviction policy. For example, control logic 220 can evict entries that least recently provided memory descriptors to descriptor cache 214 in comparison with other entries.

Reference is now made to FIG. 2C, which shows an example structure of descriptor cache 214, according to certain aspects of the disclosure. Descriptor cache 214 may include multiple entries where each entry is associated with a queue ID. In the example shown in FIG. 2C, descriptor cache 214 may include entries 214a and 214b. Each entry in descriptor cache 214 may store a queue ID, a set of memory descriptors (or other configuration data) associated with that queue ID, and the head pointer associated with the set of memory descriptors. For example, entry 214a may store a set of memory descriptors associated with packet processing task 230 and head pointer "X1" as discussed with respect to FIG. 2B. Each entry in descriptor cache 214 may also store an update indicator and a valid indicator. The update indicator, if asserted, can indicate that the memory descriptors stored in that entry are the most up-to-date and can be made available for a packet processing task. As discussed above, cache control logic 220 can determine, based on the update indicator, whether the cached memory descriptors are the most up-to-date and can provide the memory descriptors to packet processor 202 when the memory descriptors are up-to-date. The valid indicator can indicate that the entry is valid or in-use, and can be utilized to store memory descriptors associated with a particular queue ID that is associated with the entry.

Each entry in descriptor cache 214 may also store a lock counter. The lock counter can be used by cache control logic 220 to keep track of the number of pending requests accessing descriptor cache 214 for memory descriptors associated with a particular queue ID. The lock counter of an entry can be initialized to a default value such as zero when the entry of descriptor cache 214 is first allocated to the queue ID (e.g., when an initial request associated with the queue ID is received). A lock counter with the default value (e.g., zero) indicates that the entry is unlocked, and there are no pending request for memory descriptors associated with this particular queue ID. When each subsequent request for memory descriptors associated with the queue ID of the entry is received, the lock counter can then be incremented to track the number of pending requests. The lock counter can be decremented when the memory descriptors stored in that entry is provided to packet processor 202 to indicate that a pending request associated with the queue ID has been serviced.

Cache control logic 220 can also use the lock counter to determine which of the entries in descriptor cache 214 can be evicted. The lock counter can be used to determine which entry to deallocate or evict when descriptor cache 214 is full and an additional entry is needed to service memory descriptors for a request associated with a new queue ID that is not currently being serviced by the descriptor cache 214. For example, an entry with a non-zero lock counter value can indicate to cache control logic 220 that there are pending requests waiting to access memory descriptors stored in that entry for a particular queue ID. Cache control logic 220 can determine to preserve that entry, and instead evict another entry that may have a zero lock counter value (or a value indicating that entry is unlocked). Each entry of descriptor cache 214 may also store LRU information (e.g., a timestamp indicating when the entry was last accessed), and cache control logic 220 can evict the least-recently-used entry among the unlocked entries based on the LRU information. In some embodiments, if all of entries in descriptor cache 214 are locked (e.g., have non-zero lock counter values), an entry can be selected for eviction based on the LRU information and the lowest lock counter value. In some embodiments, none of the entries are evicted until one or more of the entries is unlocked. To evict an entry, cache control logic 220 can deassert the valid bit in that entry (e.g., set the valid bit to zero), which would allow the content of the entry including queue ID, the memory descriptors, the update indicator, and the lock counter to be allocated to another queue ID and be overwritten with data corresponding to requests associated with that queue ID.

Reference is now made to FIG. 3, which illustrates the operations of a descriptor cache according to certain aspects of the disclosure. FIG. 3 illustrates the changes of the content of an entry 214a in descriptor cache 214 over time for a set of memory descriptor requests.

At time 302, cache control logic 220 may receive a first request for memory descriptors from packet processor 202. The first request may be associated with, for example, packet processing task 230 of FIG. 2B, and can be directed to a set of memory descriptors associated with head pointer "X1" as shown in FIG. 2B. The first request also includes a queue ID (13) of the queue (e.g., a ring queue) that stores the requested memory descriptors, and the number of requested memory descriptors (3).

Cache control logic 220 can then search for a valid entry (e.g., with valid indicator asserted) in descriptor cache 214 that stores the ring queue ID included in the request. In the example of FIG. 3, cache control logic 220 may determine that no entry in descriptor cache 214 contains the queue ID in the request, and hence a cache-miss is detected. Based on the detection of a cache-miss, cache control logic 220 can allocate a new entry 214a to the queue ID, and obtains the latest head pointer ("X1") from queue 208. Cache control logic 220 also stores the queue ID in the newly allocated entry 214a.

At time 302, cache control logic 220 may also search prefetch cache 212 to determine whether memory descriptors associated with the queue ID (13) are being stored in prefetch cache 212. If cache control logic 220 determines that the memory descriptors are not stored, or that fewer than the requisite number of memory descriptors associated with the queue ID are stored in prefetch cache 212, packet processor 202 and/or cache control logic 220 can instruct prefetch cache 212 to obtain the set of memory descriptors including the memory descriptor associated with the latest head pointer ("X1") from the queue associated with the queue ID (e.g., queue 208). After the prefetch completes, cache control logic 220 can transmit the memory descriptors associated with head pointer "X1" (and associated with packet processing task 230) to packet processor 202. Packet processor 202 can then execute packet processing task 230, which may include, for example, performing direct memory access (DMA) using the memory descriptors received from control logic 220. In some embodiments, the memory descriptors can be provided to packet processor 202 directly from the next level memory (e.g., main memory, mid-level cache, etc.) if the memory descriptors are not available in descriptor cache 214 or prefetch cache 212.

At time 304, cache control logic 220 may receive a second request for memory descriptors associated with the same queue ID from packet processor 202. The second request may be associated with, for example, packet processing task 232 of FIG. 2B, and can be directed to a set of memory descriptors associated with head pointer "X11" as shown in FIG. 2B. In some embodiments, the head pointer "X11" for the second request may be unknown until the packet processing task associated with the previous request has progressed to the execution stage. The second request includes the same ring queue ID (13) as the first request, and may request the same number of memory descriptors (3) or a different number of memory descriptors. At that time point, cache control logic 220 determines that descriptor cache 114 already has a valid entry that is storing the queue ID included in the request (entry 214a), and a cache-hit is detected. Based on the detection of the cache-hit, cache control logic 220 increments the lock counter, to indicate that there is one pending request to access the memory descriptors from descriptor cache 214 for this particular queue ID.

At time 306, based on the detection of cache-hit, cache control logic 220 updates the current head pointer associated with the requested memory descriptors. The update can be based on the head pointer value associated with the prior request. For example, cache control logic 220 can obtain the updated head pointer value ("X11") by offsetting the previous current head pointer value ("X1") with the number of memory descriptors (3) included in the first request as the first request progresses to the execution stage. Cache control logic 220 can also search for the memory descriptors associated with the updated head pointer in prefetch cache 212 using the queue ID and the updated head pointer value. Cache control logic 220 then obtains the memory descriptors ("A11," "B11," and "C11") from prefetch cache 212 based on the updated head pointer and the queue ID, and stores the memory descriptors together with the updated head pointer value in entry 214a. Cache control logic 220 also asserts the update indicator, to indicate that the memory descriptors stored in entry 214a are the most up-to-date and are ready to be consumed by packet processor 202.

At time 308, cache control logic 220 obtains the memory descriptors from entry 214a and transmits the memory descriptors to packet processor 202. Packet processor 202 can then execute packet processing task 232, which may include performing DMA using the memory descriptors received from cache control logic 220. Cache control logic 120 can also de-assert the update indicator to indicate that the memory descriptors are not the most up-to-date for the next request. Cache control logic 220 can also decrement the lock counter as packet processing task 232 progresses to the execution stage (e.g., after the memory descriptors have been consumed by packet processors 202). In the example of FIG. 3, the lock counter value of entry 214a becomes zero after the decrementing, which can indicate that there is no pending request for the memory descriptors stored in entry 214a, and that entry 214a can be evicted to make way for a new entry allocated for another queue ID if packet descriptor cache 214 is full.

On the other hand, if at or before time 308, cache control logic 220 receives another request for memory descriptors associated with a queue ID of 13, cache control logic 120 can update the head pointer stored in entry 214a and obtain another set of memory descriptors associated with the updated head pointer from prefetch cache 212. For example, as the second request enters the execution stage, packet processor 202 may obtain the updated head pointer and instruct the prefetch cache 212 to prefetch the next set of memory descriptors to make them available for loading into descriptor cache 214. Cache control logic 220 can also assert the update indicator, and increment the lock counter of entry 214a for this particular queue ID.

Figure 4A:
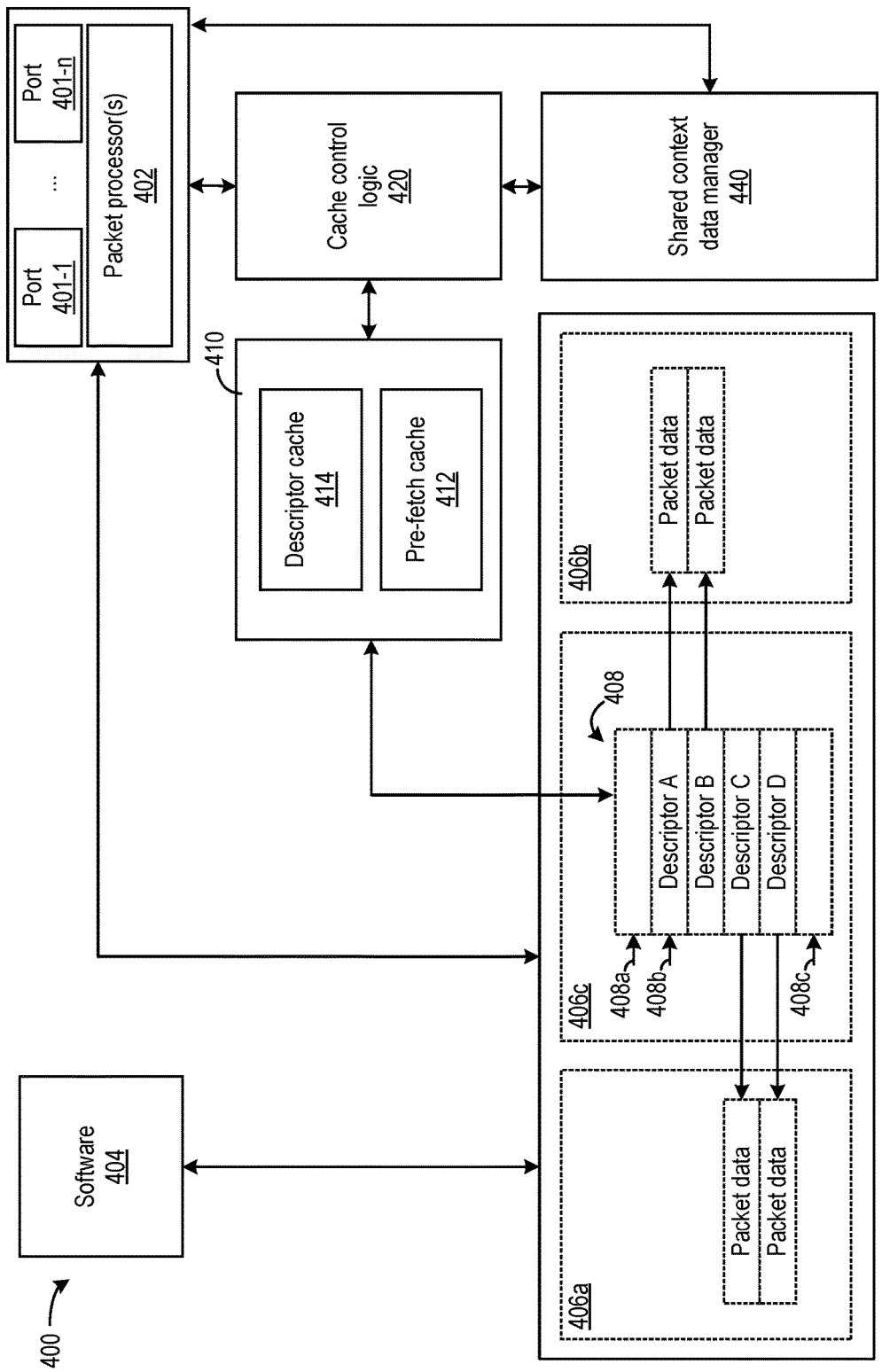
FIGS. 4A and 4B show another example of a packet processing system, according to certain aspects of the disclosure.

FIG. 4A illustrates a system 400 for performing packetized communication, according to certain aspects of the disclosure. System 400 may include multiple ports 401-1 to 401-n, each of which can be used concurrently to carry out packetized communications. System 400 may also include one or more packet processor(s) 402, software 404, and a storage memory 406. In some embodiments, packet processor(s) 402 can be implemented as a single packet processor that manages multiple ports 401-1 to 401-n, or as multiple packet processors that manages multiple ports 401-1 to 401-n. In some embodiments, each port can be managed by a dedicated packet processor. Similar to system 200 of FIG. 2A, at least part of system 400 can also be implemented on host computing system 100 of FIG. 1. For example, packet processor(s) 402 can be part of I/O adapter device 102 or external control communication port 110 of FIG. 1, and can execute one or more packet processing tasks. For example, I/O adapter device 102 (or external control communication port 110) may include two network interface ports (e.g., two Ethernet ports), and two packet processors 402 can be configured to process packets transmitted and received at each of the network interface ports. Each of packet processor can be implemented using one of an FPGA, an SoC, an ASIC, a programmable array logic (PAL), and a complex programmable logic device (CPLD), etc., or a combination thereof. Software 404 can be executed by CPU 103 of host computing system 100 of FIG. 1 and can be, for example, a driver operating in a virtual machine hosted by host computing system 100. The driver may operate with packet processor(s) 402 to transmit packets at the network interface ports, and to process packets received at the network interface ports, to perform packetized communication with another computing device over a network. In some cases, packet processor(s) 402 can execute packet processing tasks concurrently to improve the throughput of system 400.

Similar to system 200, software 404 and packet processor(s) 402 can communicate with each other using communication channel 107 (e.g., a PCI Express bus) of FIG. 1, and via storage memory 406. Storage memory 406 can also be part of memory device 106 of FIG. 1, and can be accessible by packet processor(s) 402, and by software 404. Storage memory 406 can be implement using DRAM and/or other suitable memory technologies such as flash memory, etc. Storage memory 406 can store a one or more queues (e.g., queue 408), which stores a set of memory descriptors that point to locations within storage memory 406. In the example shown in FIG. 4A, software 404 may store packet data for one packet processing task, to be executed by packet processor(s) 402 in memory region 406a. Software 404 may also store packet data for another packet processing task, to be executed by packet processor(s) 402, in memory region 406b. Software 404 can store the memory descriptors that point to these data (e.g., memory descriptors "A," "B," "C," and "D") in queue 408. Similar to queue 208 of FIG. 2A, queue 408 (e.g., a ring queue) can have multiple entries, and is also associated with a base pointer 408a, a head pointer 408b, and a tail pointer 408c. Software 404 inserts memory descriptors associated with a new packet processing task at the memory location referenced by tail pointer 408c, which is then advanced to point to the next available entry. Packet processor(s) 402 can consume a memory descriptor stored at the memory location referenced by head pointer 408b. After the memory descriptor is consumed, head pointer 408b can be updated so that packet processor(s) 402 can access a different entry to obtain memory descriptors.

System 400 further includes a cache system 410, which includes a prefetch cache 412 and a descriptor cache 414, to facilitate the accessing of the memory descriptors in queue 408 by packet processor(s) 402. Both prefetch cache 412 and descriptor cache 414 can be implemented using SRAM or other suitable memory technologies, and can be part of a SOC that includes packet processor(s) 402. Cache system 410 can be managed by cache control logic 420, which also interfaces with packet processor(s) 402. Cache control logic 420 may also be implemented using one of an FPGA, an SoC, an ASIC, a programmable array logic (PAL), and a complex programmable logic device (CPLD), etc. Under the control of cache control logic 420 and/or packet processor(s) 402, prefetch cache 412 can obtain and store a set of memory descriptors from queue 408, before packet processor(s) 402 execute the packet processing tasks that use these memory descriptors. Prefetch cache 412 also stores the memory addresses associated with the memory descriptors in queue 408, as well as the queue ID of queue 408. Descriptor cache 414 can store a set of memory descriptors obtained from prefetch cache 412 for a particular packet processing task, one or more head pointers 408b associated with the set of memory descriptors, as well as the queue ID of the queue from which the set of memory descriptors are fetched. Cache control logic 420 can receive requests from packet processor(s) 402, obtain the requested memory descriptors from packet descriptor cache 414, and then transmit the requested memory descriptors to packet processor(s) 402 in response to the requests. In some embodiments, packet descriptor cache 414 can be dedicated to an individual port, and the memory descriptors stored in packet descriptor cache 414 can be retrieved from the next level memory that is shared between the multiple ports such as the main memory and/or a shared mid-level cache.

As discussed above, packet processor(s) 402 may execute packet processing tasks concurrently to improve the throughput of system 400. Packet processor(s) 402 may also transmit requests for memory descriptors to cache control logic 420 at the same time. When processing the requests, cache control logic 420 may need to determine whether there is data dependency between the requests (e.g., data dependency between packets that are being processed), which can affect the sequence of processing the requests. For example, referring to the example of FIG. 4A, cache control logic 420 may receive a first request from packet processor(s) 402 for memory descriptors "A" and "B" and, at about the same time, a second request from packet processor(s) 402 for memory descriptors "C" and "D." For example, in some embodiments, if the head pointer to queue 408 is used to retrieve the requested memory descriptors and the head pointer is updated by servicing the first request, this can create a data dependency between the two requests in which the second request for memory descriptors "C" and "D" should not be processed until the first request has been serviced.

To facilitate management of data dependency between requests, system 400 may further include a shared context data manager 440 as shown in FIG. 4A, according to some embodiments. Shared context data manager 440 may provide a context memory for storing various kinds of shared context data for packet processing. Such shared context data may include, for example, head pointer and tail pointer of a queue, information to be included in a packet header including, for example, a network source address, a network destination address, a network protocol type, a payload type, a network source port, a network destination port, etc. Shared context data manager 440 can provide shared access to the context data for the packet processing tasks performed by packet processor(s) 402. For example, shared context data manager 440 can provide a current head pointer of queue 408 to cache control logic 420 for obtaining the memory descriptors "A" and "B." Shared context data manager 440 also provides an updated current head pointer of queue 408 to cache control logic 420 for obtaining the memory descriptors "C" and "D." To ensure the correct head pointer is provided, shared context data manager 440 may determine that the request for memory descriptors "A" and "B" has data dependency (e.g., with respect to head pointer) on the request for memory descriptors "C" and "D," and the head pointer stored in the context memory needs to be updated between the processing of the two requests. Shared context data manager 440 can also transmit an indication to cache control logic 420 to withhold processing of the request for memory descriptors "C" and "D" until the head pointer stored in the context memory is updated.

Figure 4B:
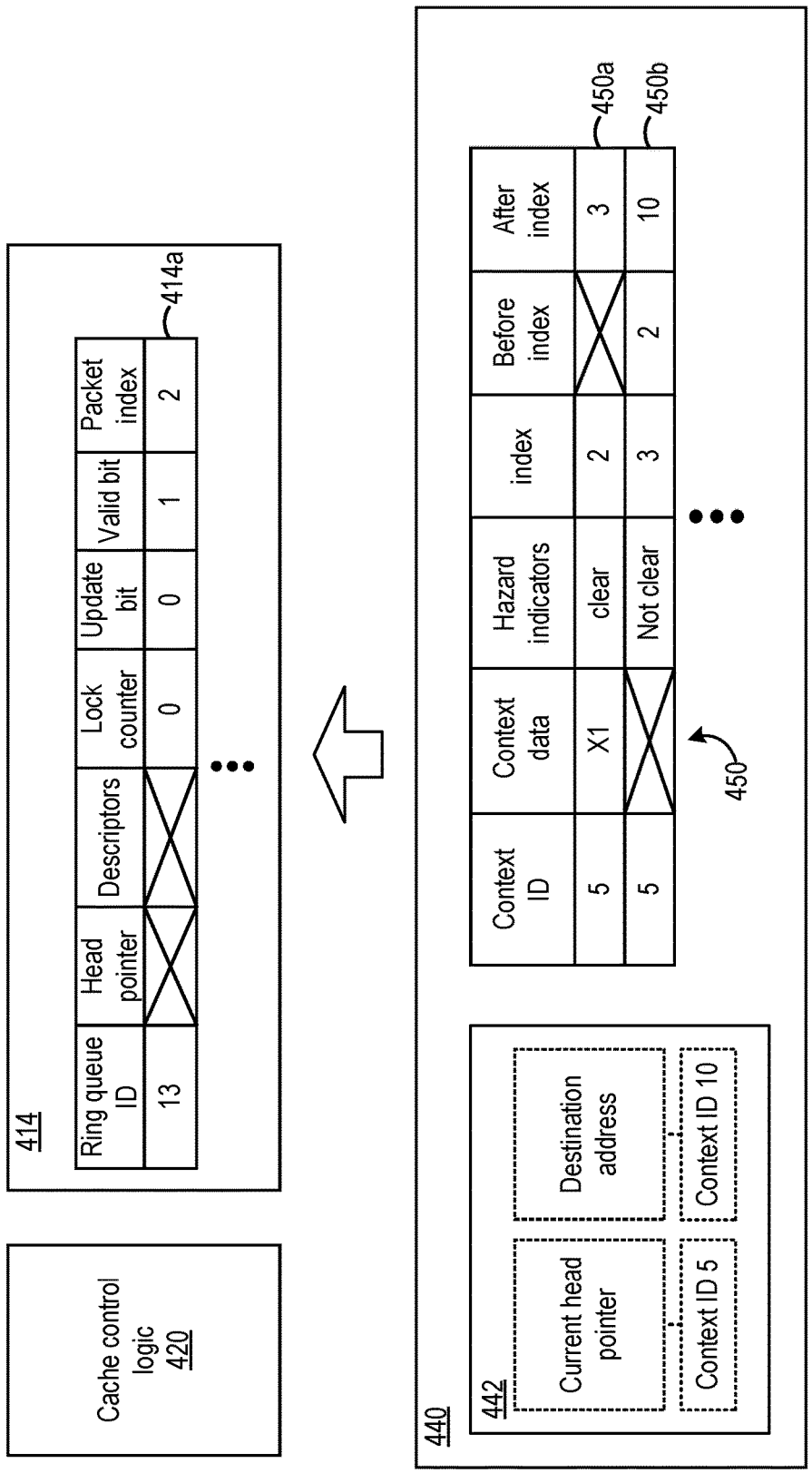

Reference is now made to FIG. 4B, which illustrates an example of some of the components of shared context data manager 440 and descriptor cache 414, according to certain aspects of the present disclosure. Shared context data manager 440 includes a context memory 442 and a context queue 450. Context memory 442 can store various context data for packet processing, and each context data can be associated with a context identifier (ID). In the example shown in FIG. 4B, context memory 442 stores the current head pointer of queue 408 and associates the stored head pointer with a context ID of 5. Context memory 442 also stores the destination address for packet transmission, and associates the stored destination address with a context ID of 10.

Context queue 450 can include a set of entries, with each entry being associated with one or more access requests to the context data (e.g., current head pointer of queue 408). The access requests can be generated from the memory descriptor requests received from, for example, packet processor(s) 402. The access requests may include a read request for the context data, a read request followed by a write-back request for the context data, etc. Each entry of context queue 450 stores a context ID of the requested context data, a copy of the requested context data, and an index (e.g., packet index) which indicates the entry's position in the queue. The entries of context queue 450 can be organized as a linked list, where the access requests are processed following the order by which the associated entries are arranged in the linked list. In the example shown in FIG. 4B, entry 450a is followed by entry 450b, as indicated by the "before index" and "after index" fields in each of entries 450a and 450b. Based on this order, the access request associated with entry 450a is to be executed before the access request associated with entry 450b. As to be discussed in more details below, cache control logic 420 may determine, based on this order, that a packet associated with the access request of entry 450b is dependent on the packet associated with the access request of entry 450a. In some embodiments, the packet index in the head entry of the context queue is provided to descriptor cache 414 as shown in FIG. 4B. In this manner, descriptor cache 414, which can be shared by multiple ports, can keep track of the order in which packet processor tasks from different ports should be processed.

Each entry of context queue 450 may also store a set of data hazard indicators. The data hazard indicators of an entry can indicate whether the access request for the context data (e.g., head pointer) have data dependency on another access request of another entry, and whether the data dependency has been resolved. In the example shown in FIG. 4B, the access request associated with entry 450a may be generated from the request for memory descriptors "A" and "B," while the access request associated with entry 450b may be generated from the request for memory descriptors "C" and "D." Shared context data manager 440 may determine that the access request associated with entry 450a (for memory descriptor request for memory descriptors "A" and "B" of queue 408) includes a write-back operation to the current head pointer stored in the context memory, which will affect entry 450b associated with memory descriptors "C" and "D" of ring queue 408. Therefore, shared context data manager 440 can set the data hazard indicators of entry 450b to indicate the data dependency on entry 450a. The data hazard stemming from the data dependency is not cleared until the write-back operation of entry 450a completes. Once the write-back operation of entry 450a completes, the data hazard indicator for entry 450b can be cleared to allow the request for memory descriptors "C" and "D" to proceed. Thus, according to some embodiments, if a request for memory descriptors has a data dependency on another request, cache control logic 420 will first determine if the data hazard has been resolved (e.g., by checking the hazard indicator in shared context data manager 440. The caching operations will proceed after the hazard indicator is cleared to indicate that any data dependency hazard has been resolved.

Methods

Figure 5:
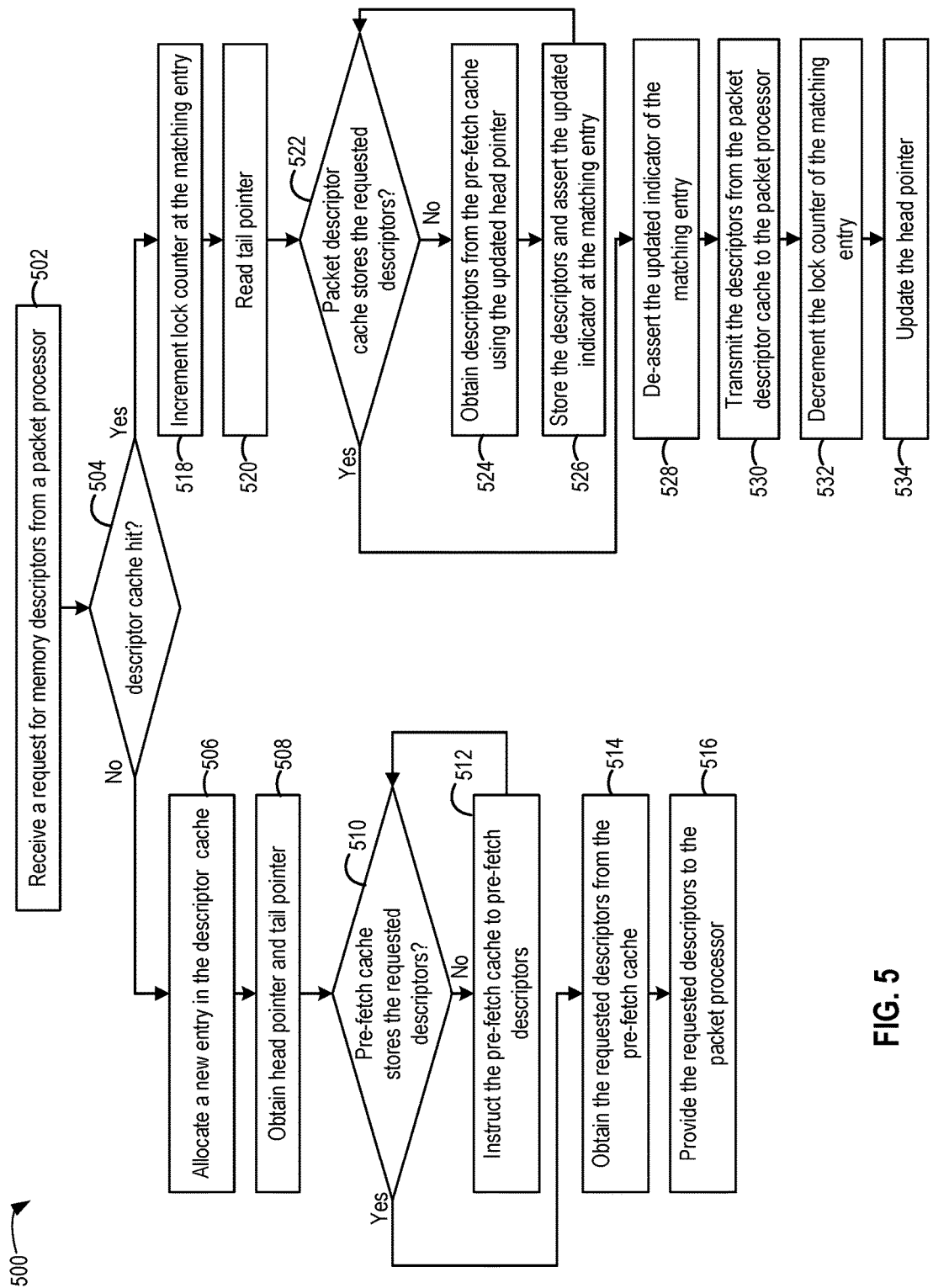
FIG. 5 shows an example of a process for processing packets, according to certain aspects of the disclosure.

FIG. 5 illustrate an example flow diagram of a process 500 for processing packets, according to certain aspects of the present disclosure. Process 500 may be implemented by various systems described above, such as, for example, cache control logic or a cache controller.

At operation 502, the system receives, from a packet processor (e.g., packet processor 202 of FIG. 2A, packet processor(s) 402 of FIG. 4A, or other data processor, etc.), a request for memory descriptors. The request may be associated with a packet processing task being executed by the packet processor and may include a queue ID of a queue (e.g., queue 208 of FIG. 2A or queue 408 of FIG. 4A) that stores the requested memory descriptors. In some embodiments, a queue storing the memory descriptors can be implemented as a ring queue, a circular buffer, or other suitable data structure, etc. The request may also indicate a number of memory descriptors to be provided to the packet processor. In some embodiments, the number of memory descriptors requested can be a predetermined number, and/or can be a number set in a programmable configuration register.

Optionally, the system may receive data dependency information (e.g., data hazard indicators and/or packet indices of FIG. 4B) for the memory descriptors request received at operation 502. The data dependency information may be received from a shared context data manager (e.g., shared context data manager 440 of FIG. 4A). The data dependency may arise from, for example, the updating of the head pointer information of a queue for multiple memory descriptors requests directed to different locations of the queue, or when the same or different queues utilize shared context data that can change over time as packet processing progresses. The data dependency information may indicate whether a particular request for memory descriptors has any data dependency on another request for memory descriptors, and whether the dependency has been resolved (e.g., the prior request has been serviced and the shared context data is up to date for the next request).

At operation 504, the system determines whether the request results in a cache-hit or a cache-miss at the descriptor cache (e.g., descriptor cache 214 of FIG. 2A, descriptor cache 414 of FIG. 4A, etc.). A cache-hit can be detected if at least one entry of the descriptor cache is storing the queue ID corresponding to the queue ID included in the request received at operation 502. In a multiport system, a cache-hit can be detected if an entry in the descriptor cache is storing the queue ID and the packet index corresponding to the request. A cache-miss can be determined if, for example, the system does not find an entry in the descriptor cache that has the matching queue ID, or a matching packet index for a multiport system.

If the system determines that there is a cache-miss (at operation 504), the system can allocate a new entry in the descriptor cache at operation 506. When allocating a new entry, the update bit for the new entry is initially deasserted. For a multiport system, the packet index of the new entry is set to the packet index corresponding to the request. The system also obtains the current head pointer and tail pointer of the queue corresponding to the queue ID at operation 508.

The system then determines whether the prefetch cache (e.g., prefetch cache 212 of FIG. 2A, prefetch cache 412 of FIG. 4A) is storing the requested memory descriptors at operation 510. As discussed above, the prefetch cache can prefetch a set of memory descriptors from the queue, and store the prefetched memory descriptors, their associated pointers (e.g., memory address), and the associated queue ID in the prefetch cache. The determination can be based on, for example, whether a pointer corresponding to the current head pointer (obtained at operation 508) and the queue ID included in the request are currently available in the prefetch cache. If the system determines that the prefetch cache does not have all of the requested memory descriptors or the queue ID (at operation 510), the system may instruct the prefetch cache to prefetch a set of memory descriptors including the requested memory descriptors from the ring queue at operation 512. If the system determines that the prefetch cache is storing the requested memory descriptors and requested ring queue ID (at operation 510), the system may obtain the requested memory descriptors from the prefetch cache at operation 514. The system can then provide the requested memory descriptors to the packet processor at operation 516. In a multiport system, the memory descriptors can be provided to the packet processor only after the hazard indicator has been cleared to indicate that any data dependencies have been resolved. When the head pointer for the next request becomes available (e.g., the current packet processing task progresses to the execution stage), the head pointer in the entry of the descriptor cache can be updated, and the update indicator can be asserted to indicate the memory descriptors for the next request can be obtained.

In some embodiments, the system may instruct the prefetch cache to prefetch additional memory descriptors so that the prefetch cache can maintain a predetermined number of memory descriptors in the prefetch cache. The system may also adjust the number of additional memory descriptors to prefetch based on the current tail pointer of the queue (obtained at operation 508) to avoid reading and storing invalid memory descriptors data from the queue.

Referring back to operation 504, if the system determines the queue ID of the request triggers a cache-hit at the descriptor cache, the system can increment the lock counter of the matching entry corresponding to the queue ID at operation 518 to indicate there is a new pending request for memory descriptors associated with the queue ID. The system may obtain the current tail pointer from the queue at operation 520. The system can also determine whether the requested memory descriptors are stored and are available at the matching entry in the descriptor cache at operation 522. The determination can be based on, for example, whether the matching entry has the number of memory descriptors stored therein, and/or whether the updated bit is asserted to indicate the memory descriptors can be obtained, etc.

If the system determines that the matching entry does not have all the requested memory descriptors (at operation 522), the system can obtain the requested memory descriptors from the prefetch cache using the updated head pointer at operation 524. The head pointer may be updated, for example, after completion of processing the previous memory descriptor request directed to the same queue. The system can transfer the memory descriptors from the prefetch cache to the descriptor cache, and assert the update indicator of the matching entry in the descriptor cache to indicate the memory descriptors are now available at operation 526. The system can repeat operations 524 and 526 until the descriptor cache has obtained all the requested memory descriptors at operation 522.

Once the descriptor cache has obtained the requested memory descriptors (at operation 522), the system can then deassert the update bit of the matching entry at operation 528. The system can transmit the memory descriptors from the matching entry of the descriptor cache to the packet processor at operation 530. In a multiport system, the memory descriptors can be provided to the packet processor only after the hazard indicator has been cleared to indicate that any data dependencies have been resolved. As the packet processing task associated with the request progresses to the execution stage and the head pointer for the next request becomes available, the system can decrement the lock counter of the matching entry at operation 532. The system may further update other information stored in the matching entry in preparation for the next memory descriptors request at operation 534. For example, the system may update the head pointer stored in the matching entry. The system may also assert the update bit to indicate the memory descriptors for the next request can be obtained.

It is noted that even though FIG. 5 describes an example process as sequential operations, some of the operations may be performed in parallel or concurrently. For example, in some embodiments, operations 530 and 532 may be performed in parallel. An operation may have additional steps not included in the figure. Some operations may be optional, and thus may be omitted in various embodiments. Some operations may be performed together with other operations. Furthermore, embodiments of the methods may be implemented in hardware, software, firmware, middleware, microcode, hardware description languages, or any combination thereof.

Computing Systems

Figure 6:
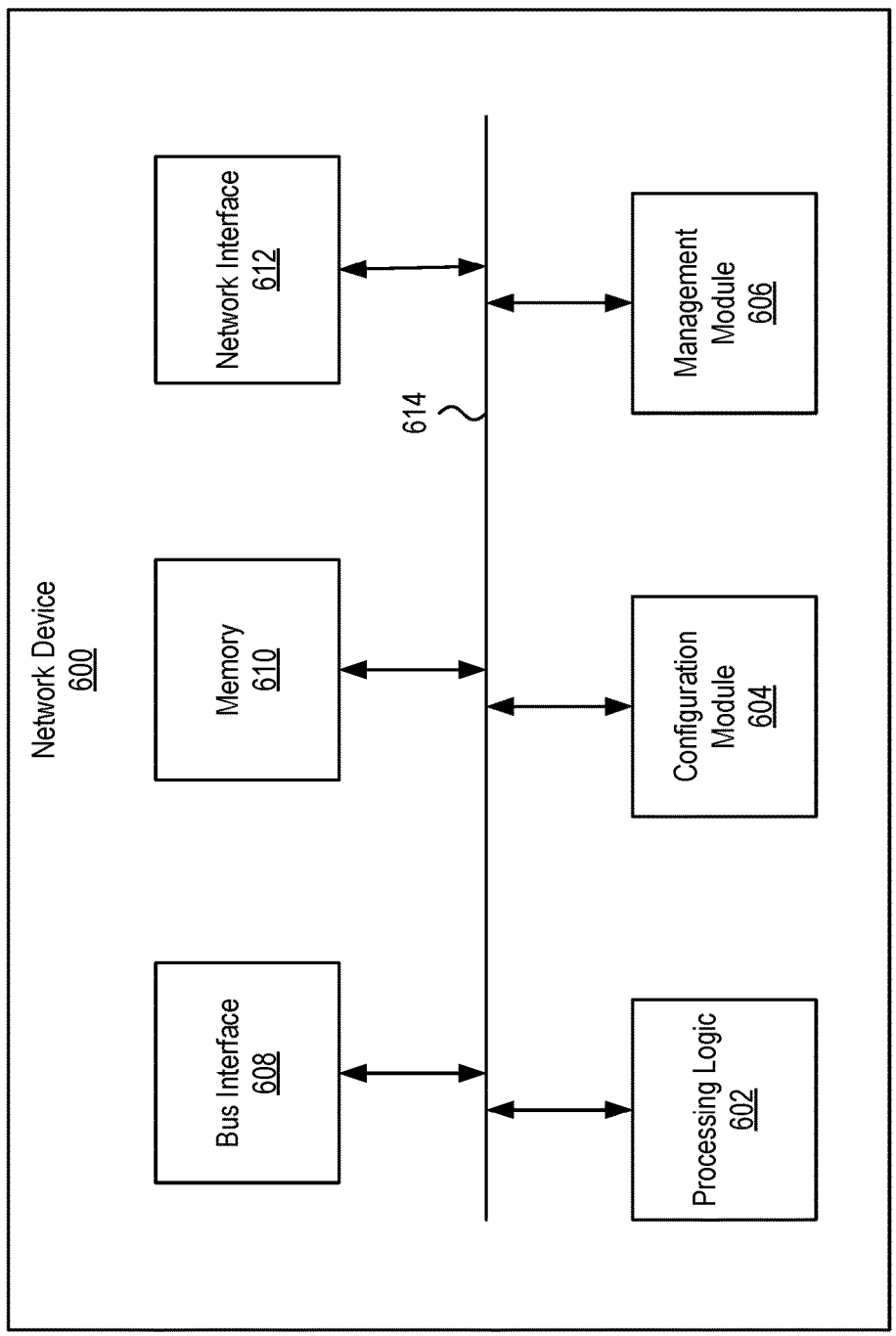
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets. At least a part of packet processing systems 200 and 400 can be implemented on network device 600.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 7. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610. Processing logic 602 may include, for example, packet processor 202 and cache system 210 of FIG. 2A, packet processors 402a, 402b, and cache system 410 of FIG. 4A.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600. Memory 610 may store queue 208 of FIG. 2A and queue 408 of FIG. 4A.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
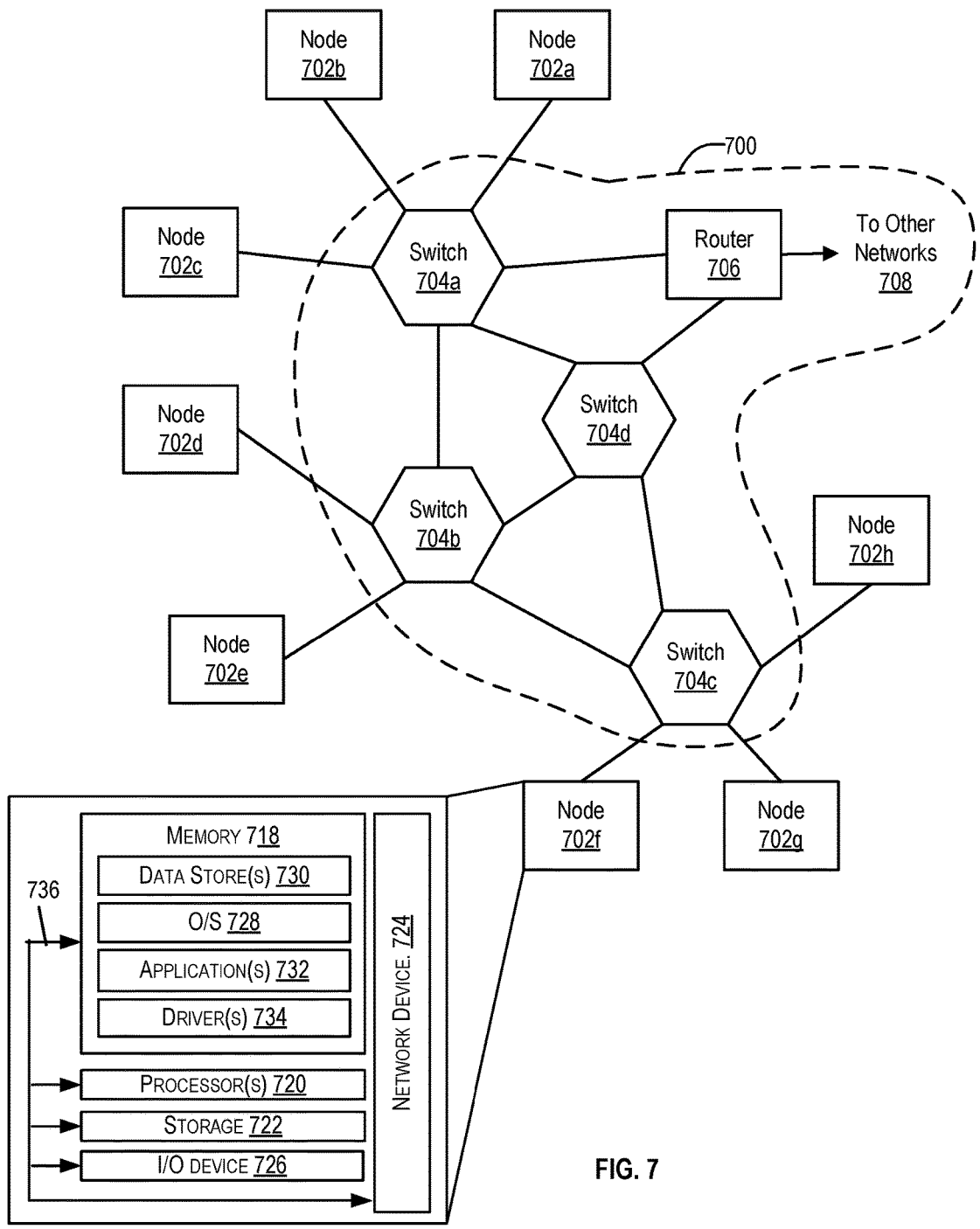
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702a-702h may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702a-702h, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702a-702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A packet processing device comprising:
a packet processor;
a storage memory implementing a ring queue, the ring queue storing a plurality of memory descriptors, and having a head pointer, a tail pointer, and a ring queue identifier;
a cache memory coupled to the storage memory, the cache memory implementing a descriptor cache; and
a cache controller coupled to the cache memory and configured to:
receive, from the packet processor, a first request for processing a first packet associated with the ring queue identifier;
allocate an entry in the descriptor cache to the ring queue identifier in response to receiving the first request;
receive, from the packet processor, a second request for processing a second packet associated with the ring queue identifier;
obtain the head pointer and the tail pointer of the ring queue associated with the ring queue identifier when the processing of the first packet progresses to an execution stage;
obtain, based on the head pointer and the tail pointer, a set of memory descriptors associated with the ring queue identifier for the second request from the storage memory;
store the ring queue identifier, the set of memory descriptors associated with the ring queue identifier, and the head pointer in the entry of the descriptor cache allocated to the ring queue identifier;
determine that the entry of the descriptor cache is storing memory descriptors for processing the second packet; and
transmit the memory descriptors stored in the entry of the descriptor cache to the packet processor for processing the second packet.

2. The packet processing device of claim 1, wherein the entry in the descriptor cache includes a lock counter associated with the ring queue identifier, and wherein the cache controller is further configured to:
increment the lock counter in response to receiving the second request for processing the second packet associated with the ring queue identifier.

3. The packet processing device of claim 2, wherein the cache controller is further configured to:
decrement the lock counter when the processing of the second packet progresses to the execution stage.

4. The packet processing device of claim 2, wherein the cache controller is further configured to:
deallocate the entry allocated to the ring queue identifier when the descriptor cache is full and the entry is unlocked.

5. The packet processing device of claim 1, wherein the cache memory further implements a prefetch cache, and wherein the cache controller is further configured to:
store the set of memory descriptors obtained from the storage memory into the prefetch cache; and
transfer the set of memory descriptors from the prefetch cache to the descriptor cache for storage in the descriptor cache.

6. The packet processing device of claim 5, wherein the entry in the descriptor cache further stores an update indicator, and wherein the cache controller is further configured to:
assert the update indicator when a head pointer pointing to memory descriptors for processing a next packet is up to date.

7. A data processing device comprising:
a processor;
a memory storing descriptors used for processing data packets associated with a queue identifier;
a cache coupled to the memory; and cache control logic coupled to the cache and configured to:
receive, from the processor, a first request for processing a first data packet associated with the queue identifier;
obtain a set of descriptors associated with the queue identifier from the memory;
store the set of descriptors in the cache;
receive, from the processor, a second request for processing a second data packet associated with the queue identifier;
determine that the cache is storing descriptors for processing the second data packet; and
provide, from the cache, the descriptors for processing the second data packet to the processor.

8. The data processing device of claim 7, wherein the cache further stores the queue identifier associated with the descriptors, and
wherein the cache control logic determines that the descriptors for processing the second data packet are stored in the cache when the cache has a matching queue identifier.

9. The data processing device of claim 7, wherein the cache further stores a packet index, and
wherein the cache control logic determines that the descriptors for processing the second data packet are stored in the cache when the cache has a matching queue identifier and a matching packet index corresponding to the second data packet.

10. The data processing device of claim 7, wherein the cache control logic is further configured to maintain a counter that counts a number of pending requests for descriptors associated with the queue identifier.

11. The data processing device of claim 10, wherein the cache control logic is further configured to determine whether to evict an entry in the cache based on a value of the counter.

12. The data processing device of claim 7, wherein the cache stores a plurality of entries, and each entry of the cache corresponds to a different queue identifier.

13. The data processing device of claim 7, wherein the memory is a main memory or a mid-level cache that is shared amongst multiple ports of the data processing device.

14. A computer-implemented method comprising:
receiving, from a processor, a first request for a first memory descriptor associated with a queue identifier;
obtaining, from a memory, a set of memory descriptors associated with the queue identifier;
storing the set of memory descriptors in a cache;
providing, from the cache, the first memory descriptor to the processor;
receiving, from the processor, a second request for a second memory descriptor associated with the queue identifier;
determining that the second request results in a cache hit based on the queue identifier;
obtaining the second memory descriptor from the cache in response to determining that the second request results in a cache hit; and
providing the second memory descriptor from the cache to the processor.

15. The computer-implemented method of claim 14, further comprising:
in response to determining that the second request results in a cache hit, incrementing a counter that represents a number of pending requests associated with the queue identifier.

16. The computer-implemented method of claim 15, further comprising:
decrementing the counter when a processor packet processing task associated with the second request progresses to an execution stage.

17. The computer-implemented method of claim 14, further comprising:
asserting an indicator that indicates a pointer for retrieving a memory descriptor for processing a next packet is up to date.

18. The computer-implemented method of claim 14, further comprising:
prefetching a predetermined number of memory descriptors associated with the queue identifier from the memory.

19. The computer-implemented method of claim 18, further comprising:
storing a pointer in the cache for retrieving memory descriptors from the memory; and
obtaining the predetermined number of memory descriptors based on the pointer stored in the cache.

20. The computer-implemented method of claim 14, wherein the cache stores a plurality of entries, and each entry of the cache corresponds to a different queue identifier.

* * * * *